United States Patent [19]

Cassity

[11] Patent Number: 4,771,828
[45] Date of Patent: Sep. 20, 1988

[54] WELLHEAD SEALS

[75] Inventor: Thomas G. Cassity, Katy, Tex.

[73] Assignee: Cameron Iron Works, USA, Inc., Houston, Tex.

[21] Appl. No.: 44,416

[22] Filed: Apr. 30, 1987

[51] Int. Cl.$^4$ .............................................. E21B 33/03
[52] U.S. Cl. .................................... 166/115; 166/182; 166/187; 166/202; 277/27; 277/236; 285/95; 285/139
[58] Field of Search ................... 166/85, 86, 120, 115, 166/182, 195, 202, 208, 212, 387, 187; 285/95, 102, 109, 139, 140; 277/16, 27, 236

[56] References Cited

U.S. PATENT DOCUMENTS

| | | | |
|---|---|---|---|
| 1,336,738 | 4/1920 | Fletcher | 277/236 X |
| 1,983,938 | 12/1934 | Humason et al. | 285/140 X |
| 2,075,899 | 4/1977 | Humason | 166/86 X |
| 2,405,152 | 8/1946 | Kilchenmann | |
| 2,746,486 | 5/1956 | Gratzmuller | 138/89 |
| 3,279,806 | 10/1966 | Bialkowski | 277/236 X |
| 4,302,018 | 11/1981 | Harvey et al. | 277/236 X |
| 4,595,053 | 6/1986 | Watkins et al. | 166/209 |
| 4,641,841 | 2/1987 | Regan | 277/236 X |

Primary Examiner—Hoang C. Dang
Attorney, Agent, or Firm—Vinson & Elkins

[57] ABSTRACT

A seal assembly for sealing across the annulus in a subsea wellhead having pressure enhancement provided behind at least one of the sealing surfaces to ensure a positive metal-to-metal sealing. In the preferred form of the invention the seal assembly includes upper sealing lips which diverge upwardly away from each other into sealing engagement with the sealing surfaces against which they are to seal, lower sealing lips which diverge downwardly away from each other into sealing engagement with the sealing surfaces against which they are to seal, and a rim secured to one of the wellhead members and space therefrom to provide a recess behind the rim and open to pressure which is directed toward the sealing lip which is to seal against such sealing surface to provide a pressure energized enhancement of the sealing engagement of the lips against said sealing surface. In other forms of the invention at least one of the rims may be used.

10 Claims, 5 Drawing Sheets

WELLHEAD SEALS

BACKGROUND

Wellhead seals of the prior art have involved the use of wedging action to spread sealing lips into sealing engagement with the interior of a wellhead housing and the exterior of a hanger, with a lip open to the pressure on its interior but not on its exterior or sealing side so that the pressure assists in urging the lip into a tight metal to metal sealing engagement. Other methods of energizing the seals have been employed to provide a radial force on the seal to urge it into tight sealing engagement with the cylindrical surface against which it is to seal.

An example of a seal with both wedging and an open lip exposed to pressure is disclosed in the U.S. Pat. No. 2,746,486 to J. L. Gratzmuller.

U.S. Pat. No. 2,405,152 to W. Kilchenmann discloses a resilient metal lip seal that is used to seal between eccentric tubular members.

U.S. Pat. No. 4,595,053 discloses an annular seal in which the seal is cup-shaped in section and is provided with an annular wedge which is received within the opening in the cup seal to force the lips of the cup seal outward and inward into tight sealing engagement with the interior of the housing and the exterior of the hanger. The sealing surfaces of the housing and hanger are provided with wickers which provide a series of threads for sealing.

SUMMARY

The present invention relates to an improved wellhead seal for sealing between spaced apart tubular members in a wellhead. Such seal is a metal seal with sealing lips which are assisted in their sealing engagement with the sealing surfaces on at least one of the sealing surfaces on the tubular members by an annular space behind one of the sealing surfaces which space is exposed to the pressure between the two members. The annular space creates an annular rim which is pressure energized toward the seal to ensure a positive metal-to-metal seal across the annulus between the tubular wellhead members.

An object of the present invention is to provide an improved seal across the annulus between two spaced apart tubular wellhead members in which at least one of the sealing surfaces is pressure energized.

Another object is to provide an improved wellhead annulus seal which is pressure energized by the pressure against which it is sealing both on the seal lips and on at least one of the sealing surfaces of the tubular members.

A further object is to provide an improve wellhead annulus seal between the wellhead housing and a hanger in which the metal-to-metal seal is subjected to multiple pressure energization.

BRIEF DESCRIPTION OF THE DRAWINGS

These and other objects and advantages are hereinafter set forth and explained with reference to the drawings wherein.

DESCRIPTION OF THE PREFERRED EMBODIMENTS

Figure 1:
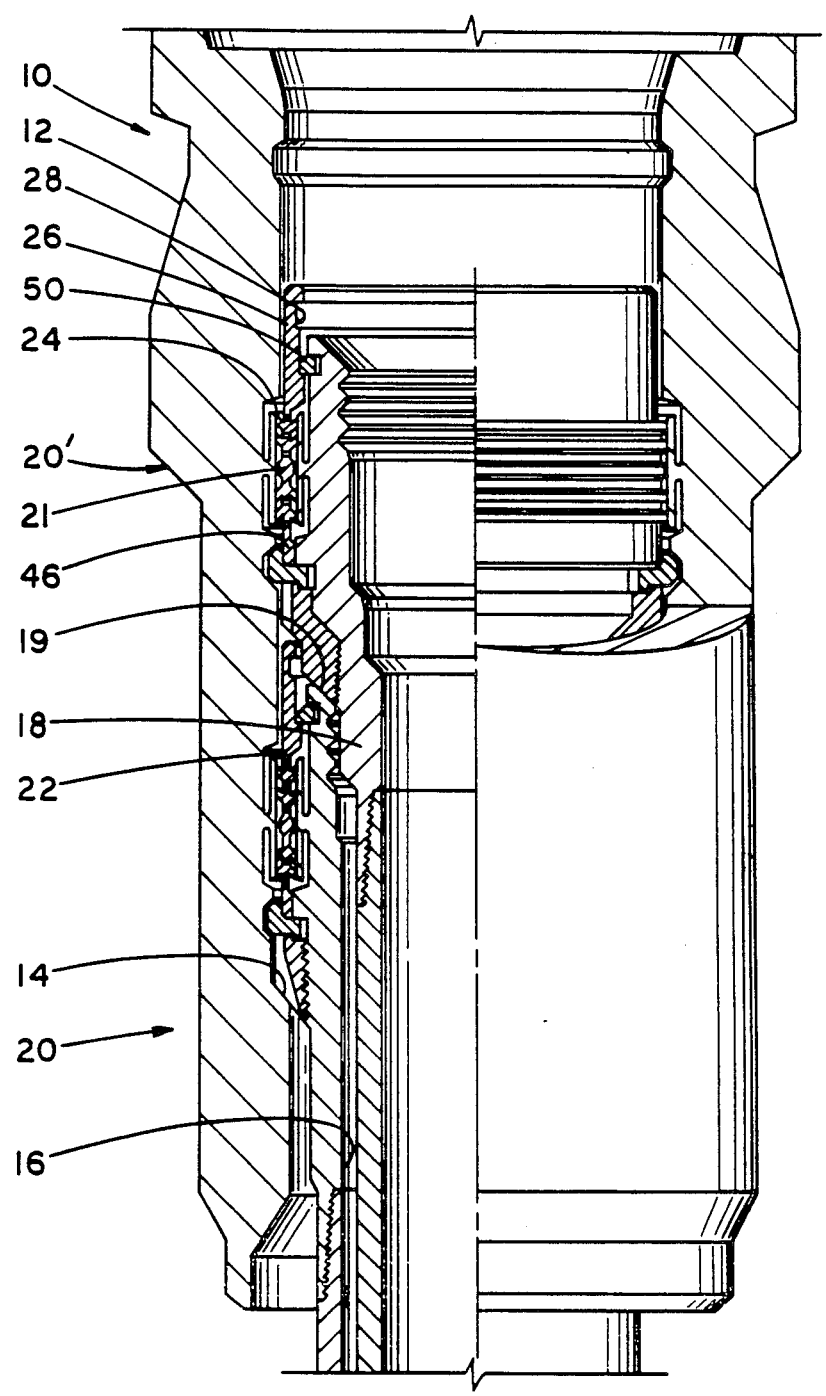
FIG. 1 is a partial sectional view of the improved wellhead seal shown with upper and lower, inner and outer pressure enhancement.

As shown in FIG. 1, the environment for the use of the improved seal of the present invention is in a subsea wellhead 10. Wellhead housing 12 includes internal downwardly tapering shoulder 14 on which first hanger 16 in landed and second hanger 18 is landed on upper tapered shoulder 19 on hanger 16. The landing and supporting hangers 16 and 18 on tapered shoulders 14 and 19 tends to provide a proper centralization of hangers 16 and 18 within housing 12. Seal assembly 20 is positioned within annular space 22 between the exterior of hanger 16 and the interior of housing 12 above support shoulder 14. Seal assembly 20' is substantially the same as seal assembly 20 and is positioned within annular space 24 between the exterior of hanger 18 and the interior of housing 12.

Figure 2:
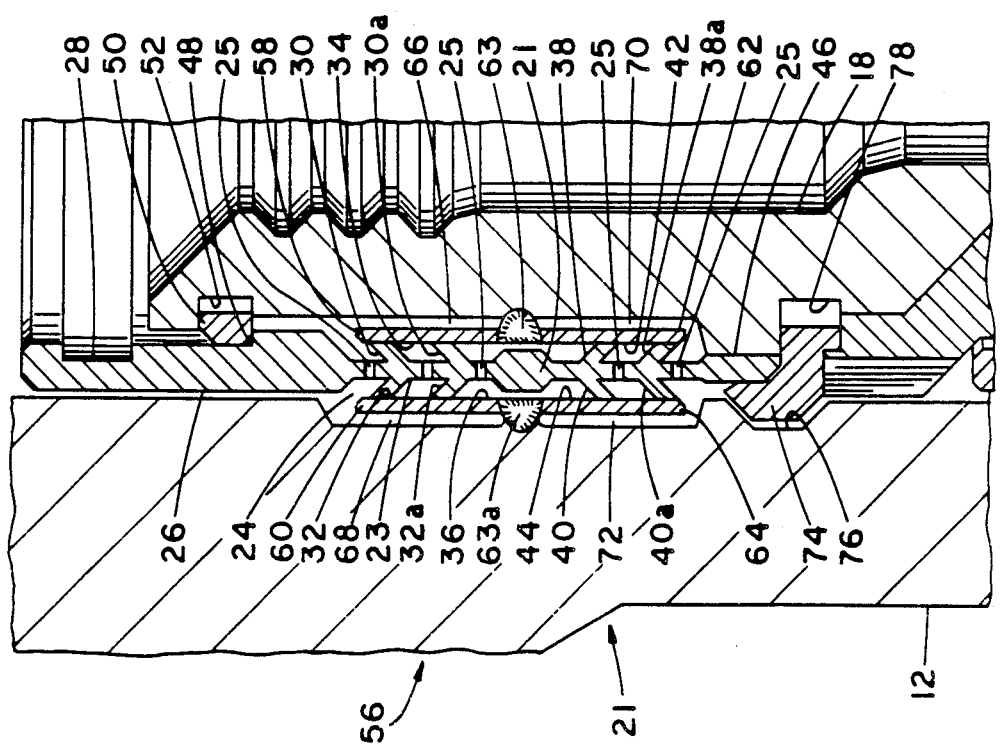
FIG. 2 is a partial detailed view of the improved wellhead seal shown in FIG. 1.
Figure 7:
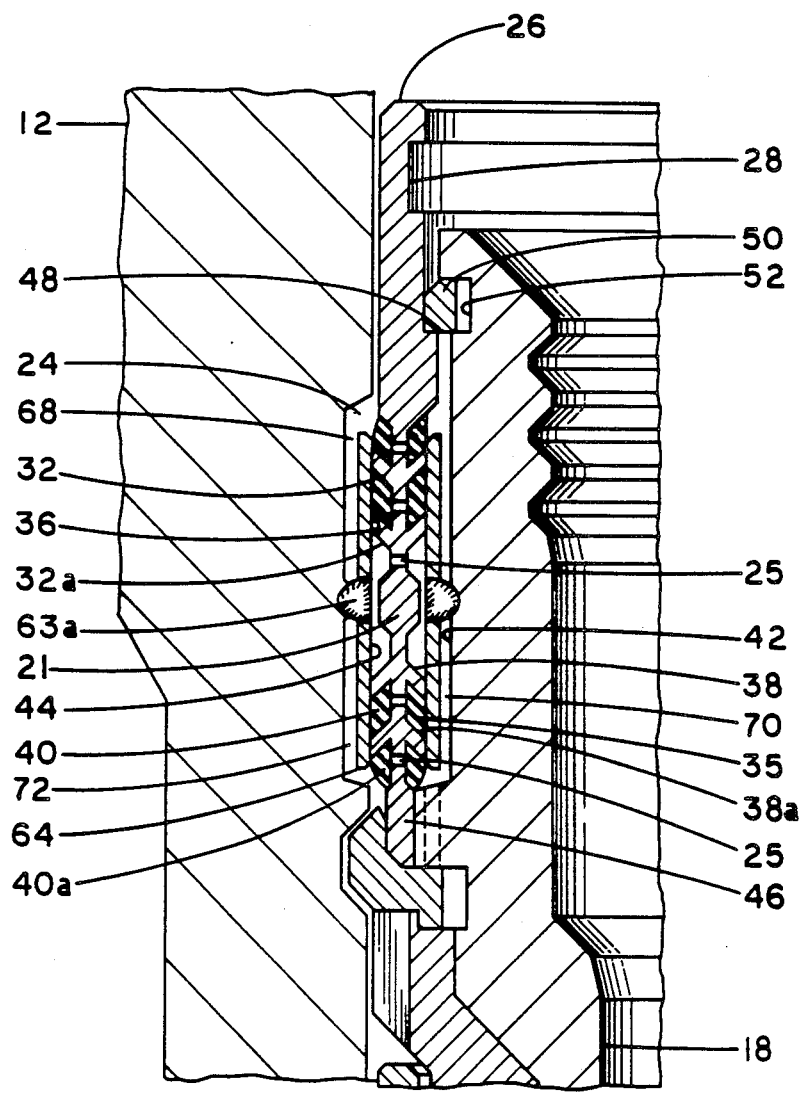
FIG. 7 illustrates a modified form of the improved seal of the present invention which includes an exclusion material in the vee seals.

As shown in FIG. 2, seal assembly 20' is annular in shape and includes upper ring 26 having internal groove 28 therein for engagement by a suitable tool as hereinafter explained, central seal lip section 21 and lower wedge ring section 46. As shown in FIG. 7, central seal section 21 includes center rim 23 to which outer upwardly facing seal lips 32 and 32a are attached with lip 32a being attached below and spaced from lip 32. Inner upwardly facing seal lips 30 and 30a are also attached to rim 23, with lip 30a being attached below and spaced from lip 30. Outer lips 32 and 32a are in sealing engagement with inner bore sealing surface 36 of wellhead housing 12 to retain pressure which would occur above lips 32 and 32a due to well bore pressure from the interior of hanger 18. Inner lips 30 and 30a are in sealing engagement with outer seal surface 34 of hanger 18 to also retain pressure from above due to the wellbore pressure from the interior of hanger 18. Also attached to center rim 23 are outer downwardly facing seal lips 40 and 40a which are in sealing engagement with inner bore sealing surface 36 of wellhead housing 12 to retain wellbore pressure from the well formation acting on annular space 24 between housing 12 and hanger 18. Lip 40a is attached to center rim 23 below and spaced from lip 40. Also attached to center rim 23 are inner downwardly facing seal lips 38 and 38a which are in sealing engagement with outer sealing surface 34 of hanger 18 to also retain wellbore pressure from below acting on annular space 24 between housing 12 and hanger 18. The two pairs of upwardly facing lips (30, 32, and 30a, 32a) in conjunction with center rim 23 form upwardly facing vee type seals, which alone are inherently pressure energized. In a similar manner the two pairs of downwardly facing lips (38, 40 and 38a, 40a) form vee type seals. To ensure equalization of pressure on both sides of center rim 23, radial holes 25 allow fluid communication through center rim 23. Inner shoulder 48 on upper ring 26 faces upwardly at a position below groove 28. Split lock down ring 50 is normally carried within groove 52 on the exterior of hanger 18 during running. To ensure ingress and egress of seal assembly 20' past split ring 50 and variation of the upper bore of housing 12 the areas above and below the vee seals can be filled with an exclusion material 35, such as a 90 durometer rubber or a plastic material. In some applications a lock down ring, such as 50, may not be required or even desired and in such an application the exclusion material 35 may be omitted.

Sealing enhancement means 56 are shown in the drawings. In FIGS. 2 and 7 such seal enhancement means includes upper rims 58 and 60 and lower rims 62 and 64 positioned to provide the upper and lower sealing surfaces 34, 36, 42 and 44 for the upper and lower seal lips 30, 30a, 32, 32a and 38, 38a, 40 and 40a. Rims 58, 62 and 60, 64 are spaced from the interior and exterior surfaces of hanger 18 and housing 12 to which they are attached and provide recesses 66, 70, 68 and 72 respectively and sealing surfaces 34, 42 and 36, 44 respectively. The enhancement of the sealing is provided by the pressure which enters the recesses behind the rims and urges the rims in the direction of the respective sealing lips. It should also be noted that in their set position as hereinafter explained, the sealing lips seal against the sealing surface provided by the rims at a point near the extremity of each rim so that pressure within annular space 24 does not equalize on both sides of the rim to negate the pressure enhancement of the rim. Rims 58, 62 and 60, 64 should be integral with hanger 18 and housing 12 respectively. In some applications it may be possible to form the rims by machining the recesses into the hanger and housing. In other applications, it may be more desirably to weld the rims to the hanger and housing as shown at 63 and 63a. In this case it is anticipated that the upper outer rim 60 and the lower outer rim 64 both be two semicircular halves welded together.

All of the vee seals diverge outwardly sufficiently to come into tight sealing engagement with their respective sealing surfaces before they are exposed to pressure. It should be noted that lower seal lips 38, 40 and 38a, 40a diverge downwardly away from each other and thus are pressure energized into tight sealing engagement with their respective sealing surfaces 44 and 24 whenever there is a pressure in the annular space 24 below them. Also, upper sealing lips 30, 32 and 30a, 32a diverge upwardly away from each other and thus whenever there is a pressure in the annular space 24 above them, they are pressure energized into tighter sealing engagement with sealing surfaces 34 and 36.

After hanger 18 has been landed upon support shoulder 19, a suitable tool (not shown) is used to cause seal assembly 20' to move downward into annular space 24. This movement moves all eight sealing lips to the positions shown in FIGS. 1 and 2 from a position above. This downward movement also moves lower wedge ring 46 into position within the upper portion of latching ring 74 to wedge ring 74 outward into latching engagement within groove 76 on the inner surface of housing 12. Since as shown in FIG. 1, latching ring 74 after being moved into engagement in groove 76 also remains in engagement within groove 78 on the exterior of hanger 18, it locks hanger 18 within housing 12. Further, the downward movement of seal assembly 20' brings shoulder 48 to the level of the lower portion of groove 52 which allows split ring 50 to move outwardly into position, thereby locking seal assembly 20' to the exterior of hanger 18.

Figure 4:
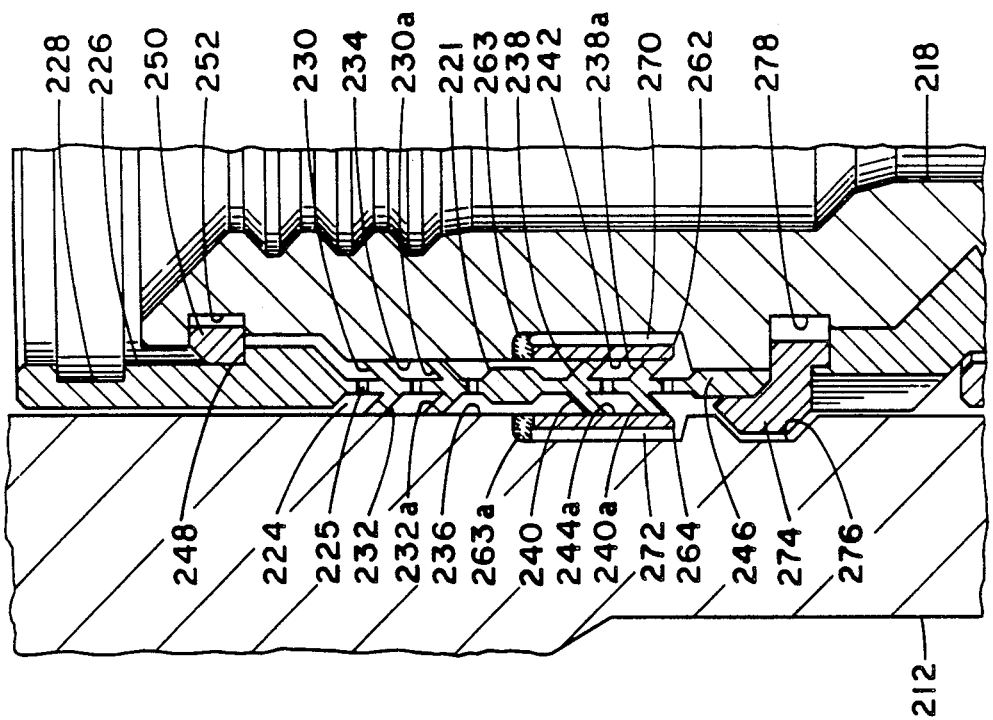
FIG. 4. is another detailed partial sectional view of the improved wellhead seal shown with lower inner and outer pressure enhancement.
Figure 3:
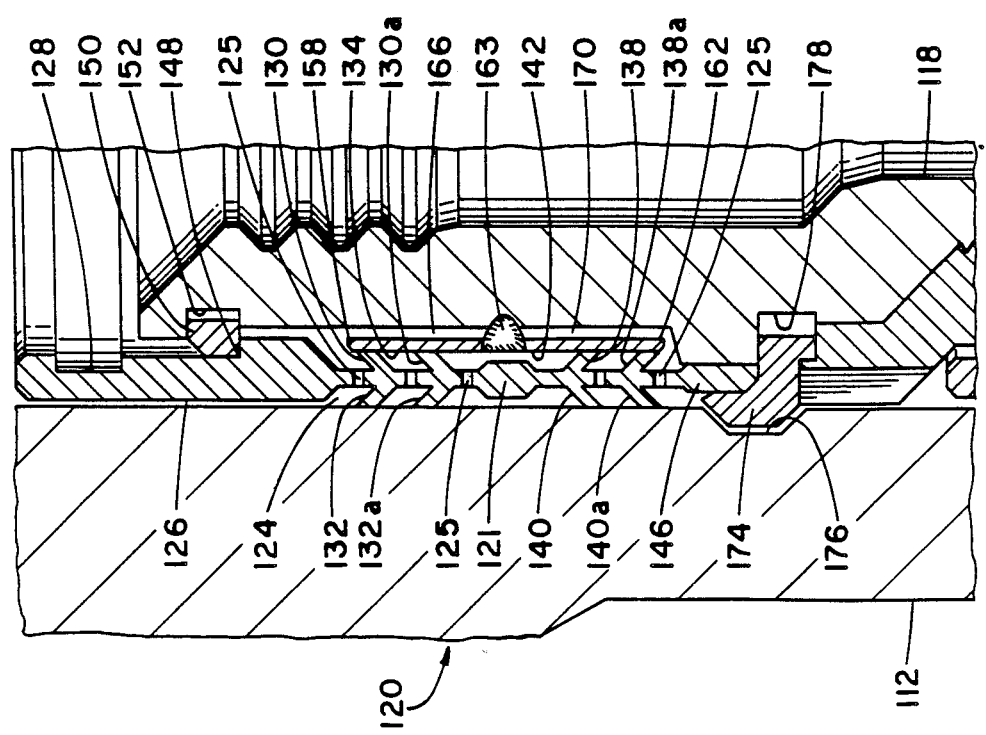
FIG. 3 is a detailed partial sectional view of the improved wellhead seal shown with upper and lower inner pressure enhancement.

In FIG. 3, a modified form of seal assembly with sealing enhancement means on the hanger only is shown as seal assembly 120 and other elements are numbered the same as in FIGS. 1, 2 and 7 with the prefix "1" added. Seal assembly 120 uses only inner, upper and lower sealing surfaces 134 and 142 which are provided by rims 158 and 162. Rim 158 is spaced from the exterior surface of hanger 118 to provide an annular recess 166 which is open to the annular space 124 between housing 112 and hanger 118 above upper seal lips 130, 132 and 130a, 132a. Rim 162 is spaced from the exterior surface of hanger 118 to provide an annular recess 170 which is open to the annulus between housing 112 and hanger 114 below lower seal lips 138, 140 and 138a 140a. The modified form of the invention shown in FIG. 4 has sealing enhancement means on only the lower part of the housing and hanger. Part markings are similar to previous figures but with the prefix "2" added. Seal assembly 220 uses only the rims 262 and 264 providing the pressure enhancement for the sealing against their surfaces 242 and 244 while upper sealing surfaces 234 and 236 are provided on the exterior of hanger 218 and the interior of housing 212. Rim 262 is spaced from the exterior of hanger 218 and rim 264 is spaced from the interior of housing 212 to provide the annular recesses 270 and 272 which are exposed to pressure within the annular space below seal assembly 220.

Figure 5:
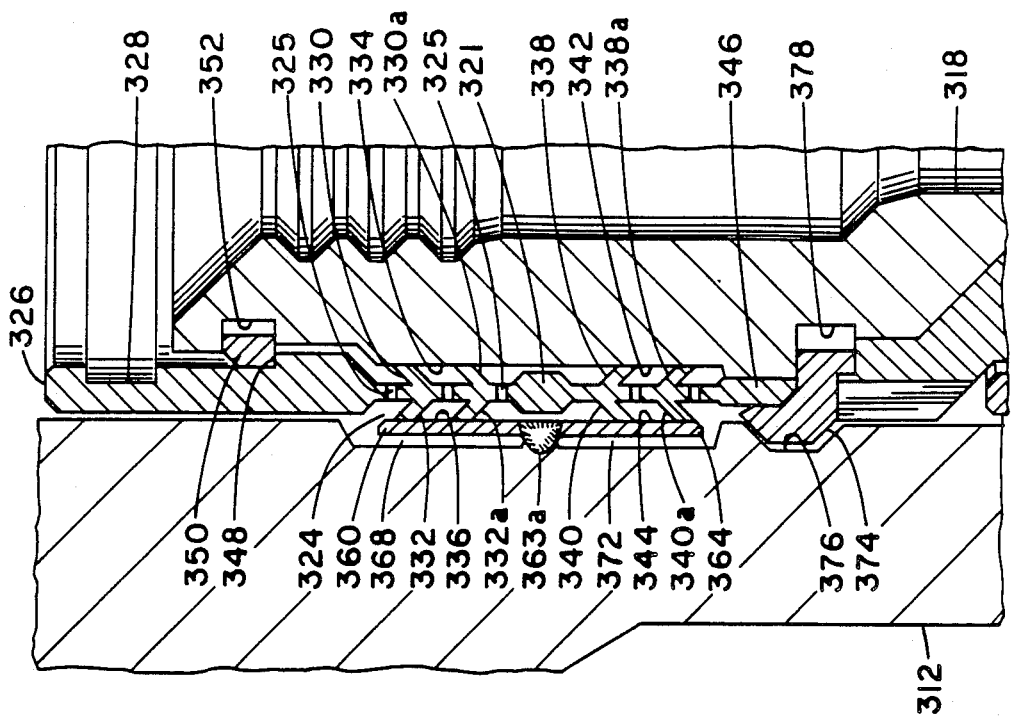
FIG. 5 is still another detailed partial sectional view of the improved wellhead seal shown with upper and lower outer pressure enhancement.

Another modified form of the invention with sealing enhancement means on the housing only is shown in FIG. 5 and uses similar part numbering but with the prefix "3" added. Seal assembly 320 uses only the outer upper and lower rims 360 and 364. This provides the recesses 368 and 372 which provides pressure enhancement for the sealing against the sealing surfaces 336 and 344. In this structure the pressure in the annular space is effective to provide the pressure enhancement from both above and below depending on the source of the pressure.

Figure 6:
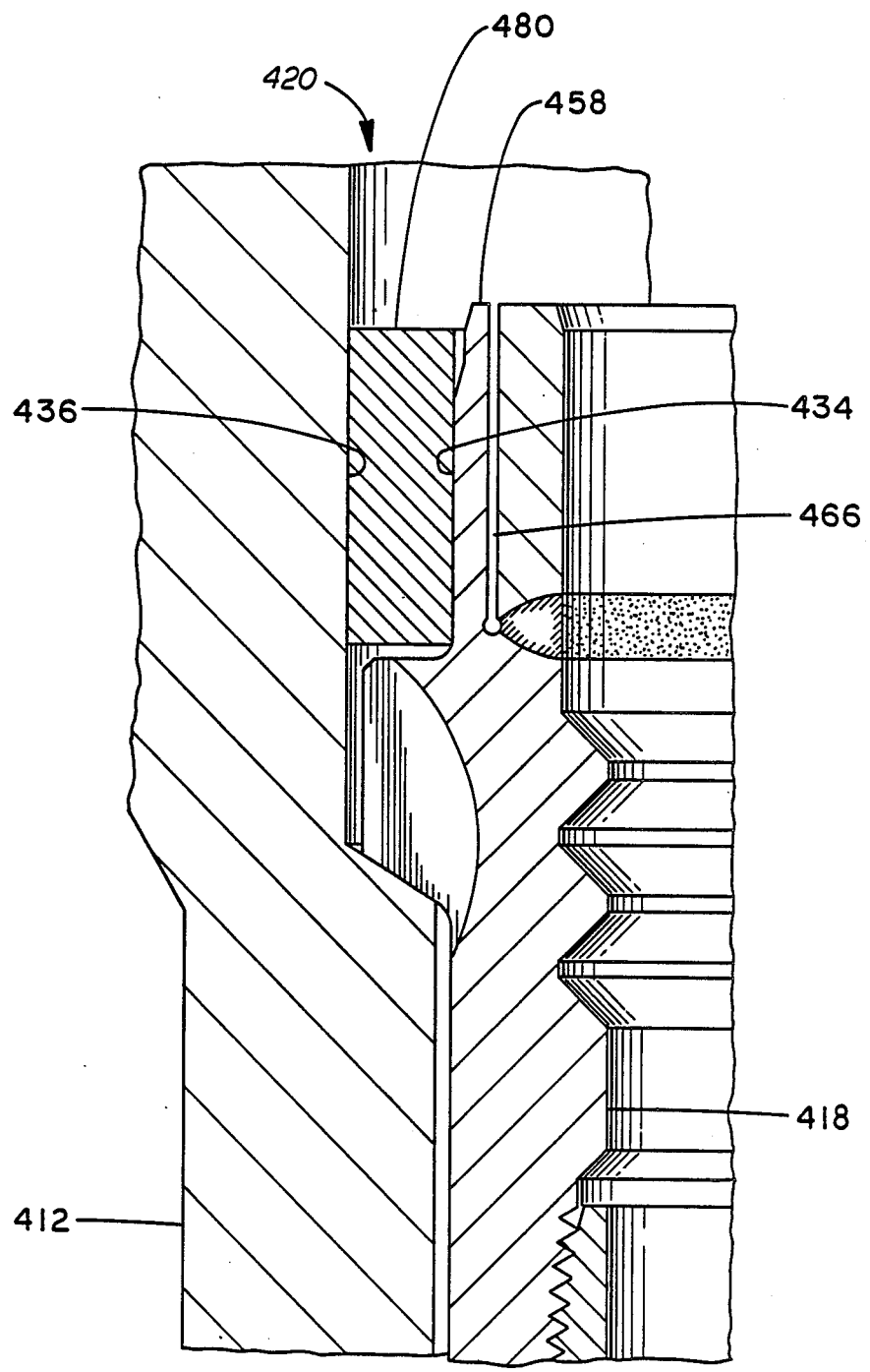
FIG. 6 is another detailed partial sectional view of a modified form of the improved wellhead seal of the present invention.

Still another modified form of the present invention is shown in FIG. 6 using similar numbering with the prefix "4" added. Seal assembly 420 utilizes the rim 458 on hanger 418 with the recess 466 exposed to pressure in the annular space above the sealing element 480 which is an annular element of soft metal positioned between the interior sealing surface 436 of the housing 412 and sealing surface 434 on the exterior of rim 458. The sealing element 480 is sufficiently large so that there is initial sealing of the element 480 against the sealing surfaces 434 and 436. In this form of the invention, only a single rim 458 and its attendant recess 466 are shown. It should be noted, however, that any of the four variations of this single rim and recess could be used and still achieve the improved pressure enhancement of the present invention.

It is suggested that the recesses behind the rims could be filled with a suitable pressure transmitting material, such as silicone or RTV rubber, which will not interfere with the pressure enhancement but will protect the recesses from loading with well materials which might subsequently prevent proper operation of the pressure enhancement.

While five forms of the present invention have been illustrated and described, it should be understood that the pressure enhancement achieved by the improvement of the present invention may be utilized singly or in any combination of the rims illustrated in FIGS. 1 and 2. The enhanced sealing is achieved only when the recess behind the rim is open to the pressure in the annulus. The rims are illustrated as being either integral with the hanger and the wellhead housing or being welded to such structures in a manner providing the necessary strength and the desired recess associated with the rim. The strength of the rims should be such that they respond to pressure within their recesses but not so weak that they are stressed beyond their yield point. Very slight movement of the rims is sufficient to provide a substantial improvement in the effective sealing of the sealing lips.

What is claimed is:

1. An annular wellhead seal for sealing across an annular space between an inner wellhead member and an outer wellhead member comprising
   one of said wellhead members having a sealing surface facing the other of said wellhead members,
   an annular metal tip having one end secured to the other of said wellhead members, said annular lip extending axially of said other wellhead member from its secured end to its opposite end which is spaced from said other wellhead member, said annular lip having a sealing surface facing said one of said members,
   an opening between said annular lip and the wellhead member to which it is secured facing in a direction from which pressure is received, and
   an annular metal seal positioned between said sealing surfaces and in sealing engagement therewith,
   said annular seal being in sealing engagement with the sealing surface on said lip at a point near the opposite end of said lip whereby pressure between said lip and its wellhead member urges said lip into tight sealing engagement with said annular seal.

2. An annular wellhead seal according to claim 1 wherein
   said annular lip is on the inner wellhead member facing the outer wellhead member.

3. An annular wellhead seal according to claim 1 wherein
   said annular lip is on the outer wellhead member facing the inner wellhead member.

4. An annular wellhead seal according to claim 1 wherein
said annular lip is on the inner wellhead member with its sealing surface facing the outer wellhead member and further including
an annular metal lip having one end secured to the outer wellhead member, said annular lip extending axially of the outer wellhead member, and said annular lip having a sealing surface facing said inner wellhead member,
an opening between said annular lip on said outer wellhead member facing in a direction from which pressure is received.

5. An annular wellhead seal according to claim 1 wherein
   said opening behind said annular lip faces axially downwardly.

6. An annular wellhead seal according to claim 1 wherein
   said opening behind said annular lip faces axially upwardly.

7. An annular wellhead seal according to claim 4 wherein
   the openings behind said annular lips faces axially downwardly.

8. An annular wellhead seal according to claim 4 wherein
   the openings behind said annular lips face axially upwardly.

9. An annular wellhead seal according to claim 1 wherein said annular seal includes
   a tubular body having a plurality of sealing lips extending inwardly and outwardly toward the inner and outer sealing surfaces and being inclined axially of said tubular body in the direction from which pressure is received.

10. An annular wellhead seal according to claim 1 wherein
    said wellhead members each have a pair of annular lips, one extending axially upward and one extending axially downward,
    said annular seal includes a tubular body with a pair of inner and outer upwardly facing sealing lips, the upper of each of said pair of lips engaging the sealing surface on the upper annular lips near their upper ends, and a pair of inner and outer downwardly facing sealing lips, the lower of each of said pair of lips engaging the sealing surface on the lower annular lips near their lower ends.

* * * * *